Patented Oct. 18, 1949

2,484,923

UNITED STATES PATENT OFFICE 2,484,923

SCAVENGING TWO-CYCLE INTERNAL-COMBUSTION ENGINE

Karl V. Anderson, Milwaukee, Wis., assignor to Nordberg Manufacturing Co., Milwaukee, Wis., a corporation of Wisconsin Application November 18, 1946, Serial No. 710,579

9 Claims. (Cl. 123—65)

This invention relates to the scavenging of two cycle internal combustion engines, with or without supercharging as an incident to scavenging.

Generally stated, the invention contemplates the use of an air inlet valve of the poppet type, which is mounted in the head, has a diameter ¾ to ⅘ that of the engine cylinder and so is of large flow capacity. The exhaust valve is much smaller, is mounted in the inlet valve and coacts with a seat formed in the inlet valve. The piston and valves are so formed as to define at the head end dead point an annular chamber of approximately toric form into which one or more fuel injection valves discharge fuel in the general direction of the circumference of the chamber. The scavenging air passages are formed with guides which impart a whirling motion to the entering air about the axis of the cylinder.

From the arrangement above outlined a number of important advantages flow.

Since all valves are in the head, there are no piston-controlled ports. This saves wear on the piston rings, permits a more favorable location of the rings and saves space.

The air inlet valve is of materially larger flow capacity than the exhaust valve, so that throughout exhaust a desirably higher pressure is maintained in the cylinder than exists in the exhaust manifold.

In a two cycle engine, exhaust and scavenging occur at the end of the working stroke, at which time the piston is remote from the exhaust valve and scavenging valve. The relatively cold, dense entering air is directed to the cylinder walls, and tends to flow in a thin stream down the walls because of the centrifugal effect imparted by the whirling motion about the cylinder axis. When this flow encounters the piston, the air tends to turn inward, and having been heated is less dense and hence flows back through the cylinder in a stream through the central portion of the cylinder to the central exhaust port. Thus, no unswept pockets exist and excellent scavenging is assured. The scavenging air is unusually effective to cool the cylinder walls.

The exhaust valve opens before the scavenging valve opens, and closes not later than the closing of the scavenging valve. As a rule, however, the scavenging valve closes after the exhaust valve has closed.

The arrangement of the fuel injection valves favors mixing of fuel and air, and mixing is enhanced by such residual whirl of the air about the axis of the cylinder as may persist.

However, the piston and combustion space in the cylinder are so formed that as the piston approaches the head end dead point a toric whirl of marked intensity is induced, and the turbulence thus produced is much more important.

The piston and the air valve are cooled by oil circulated through them and drawn from the pressure lubricating system of the engine.

The invention will now be described by reference to the accompanying drawings illustrating a typical 4 cylinder vertical engine embodying the novel features.

In the drawings:

Fig. 1 is a section on the axis of one of the cylinders and transverse to the axis of the crank shaft.

Fig. 2 is a view partly in plan and partly in horizontal section of the 4 cylinder engine. Counting from the top of the view, the first cylinder is shown in plan; the second in section on the line 2a—2a; the third in section on the line 2b—2b; and the fourth in section on the line 2c—2c. The planes of section are indicated in Fig. 1.

Fig. 4 is a fragmentary section, similar to a portion of Fig. 1, showing diagrammatically how the toric whirl is induced as the piston approaches the head end dead point.

Figure 1:
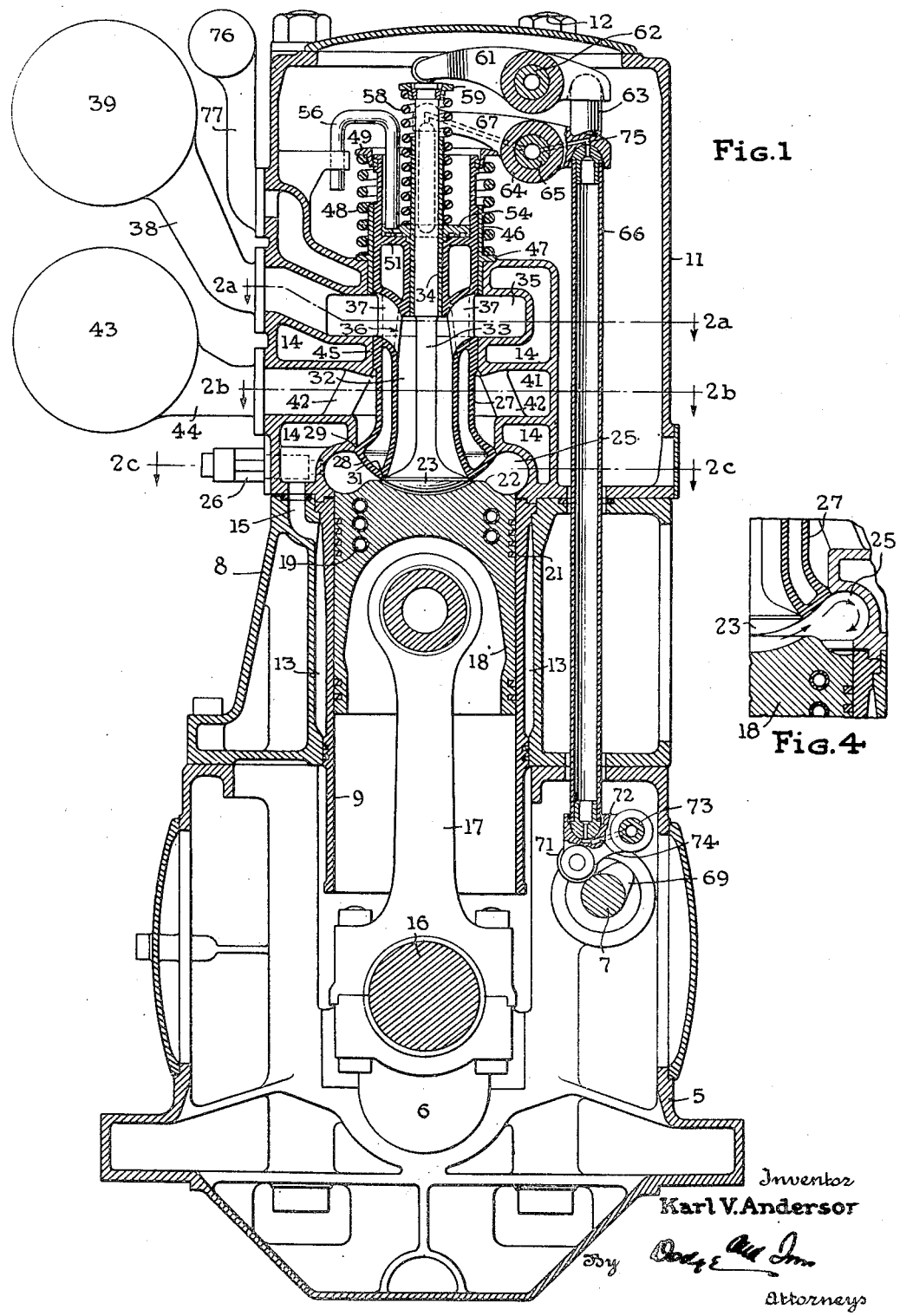

The base 5 for the engine has bearings for the crank shaft 6 and cam shaft 7, and supports a cylinder block 8 in which are mounted liners 9 for the various cylinders.

There is an individual cylinder head casting 11 for each cylinder. Ten tie rods 12 hold the base casting cylinder block and cylinder heads in assembled relation. The cam shaft 7 is driven at the same angular velocity as the crank shaft by any suitable drive (not shown).

The liners 9 are so mounted and the block 8 is so formed as to provide jackets 13 which communicate with cored jacket spaces 14 in the corresponding head by passages 15. The water circulating connections for the jackets so formed are conventional and are only partially illustrated.

Each crank 16 on shaft 6 is connected by a pitman 17 with a piston 18 working in the corresponding cylinder liner 9. Each piston 18 has a cooling coil 19 through which oil is circulated from the pressure lubricating system of the engine. It is known practice to feed cooling oil through the crank shaft and pitman and cause it to discharge from the piston into the crank case. Hence, it is deemed unnecessary to illustrate these conventional connections.

The piston 18 has the usual rings 21 and since there are no ports in the liner 9, the rings are not subjected to excessive wear and can be located more favorably than is possible in a port scavenged engine.

Figure 2:
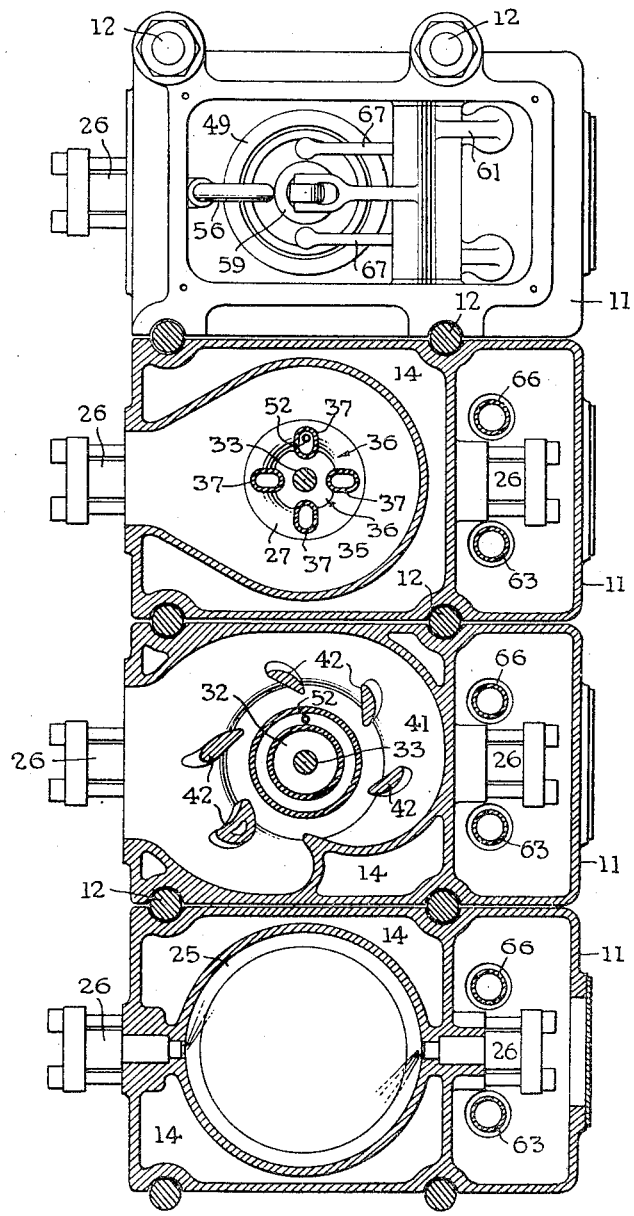
Figure 3:
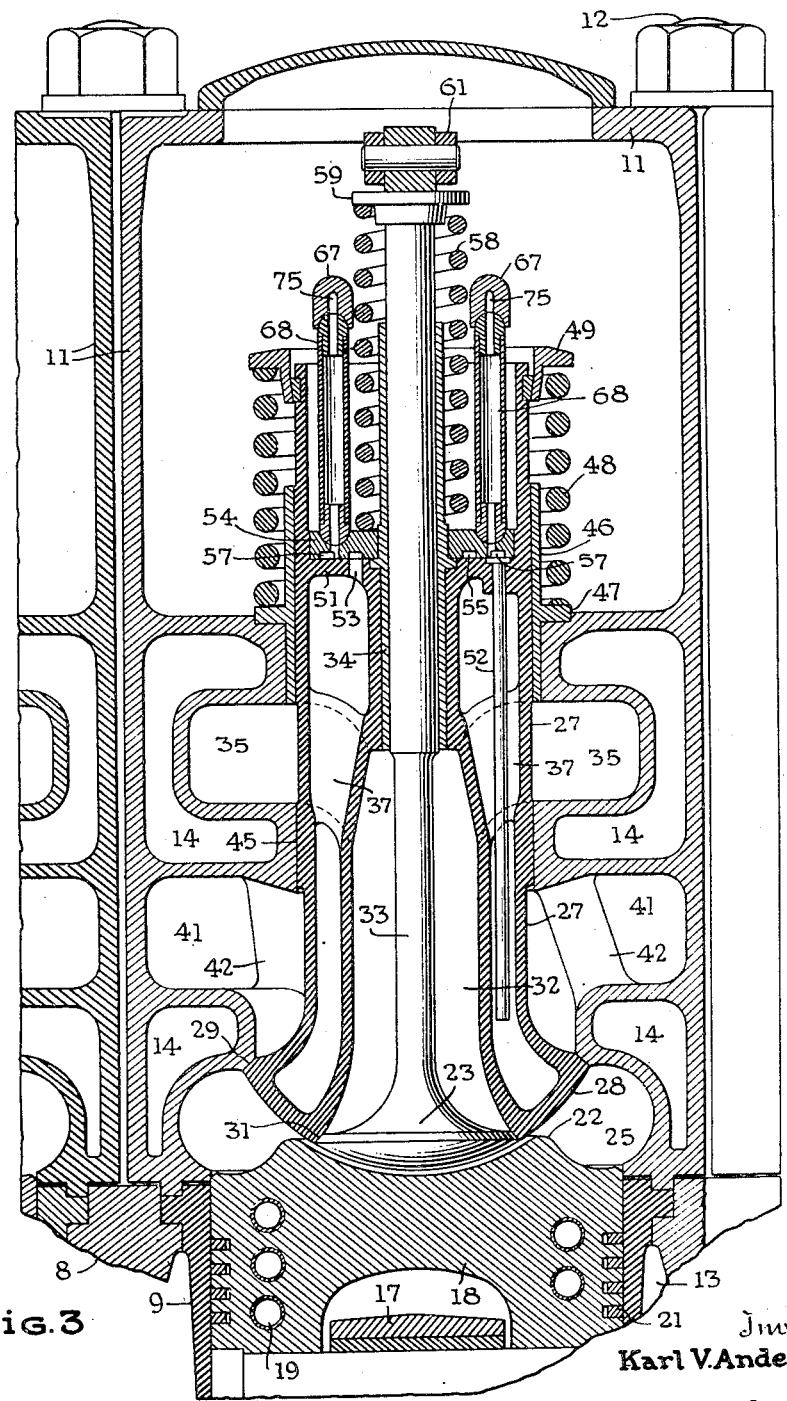
Fig. 3 is an axial section through the valve on a plane at 90° to the plane of section of Fig. 1. The view is drawn on a larger scale than are Figs. 1 and 2.

Each piston has in its top a central concavity and a marginal cove separated by an annular rim 22. When the piston is at the head end dead point the central concavity is nearly filled by the head of exhaust valve 23 and the marginal cove merges into a complementary annular cove formed in the head casting so as to provide an annular space 25 of toric form into which the fuel injectors 26 discharge. Two injectors are shown but the number is not critical. As indicated in the fourth cylinder of Fig. 2, the fuel is projected in circumferential directions.

The air inlet valve or scavenging valve is of the poppet type and comprises a cored sleeve 27 with a head 28 which seats at 29 on a portion of head 11 at the top of toric annular space 25 and has a seat 31 for the poppet exhaust valve 23. The valve 23 controls a central exhaust passage 32 which leads axially through the air inlet valve and the stem 33 of valve 23 is reciprocable in a guide bushing 34 fixed in the air valve. The purpose of the cored construction is to permit the air valve, and the seat for the exhaust valve to be liquid cooled by means hereinafter described.

Each cylinder head 11 has an annular exhaust chamber 35 (see the second cylinder of Fig. 2) which surrounds sleeve 27 of the air inlet valve which is there formed with ports 36 between the cored webs 37. Ports 36 communicate with exhaust passage 32 in the air valve and chamber 35 is connected by a corresponding branch 38 with exhaust manifold 39 (see Fig. 1).

Each cylinder head has, below chamber 35, an air chamber 41. Chamber 41, when viewed in plan (see the third cylinder of Fig. 2), has a snail shell form and has vanes 42 (some of which are cored as shown), arranged to impart a whirling motion to air flowing from chamber 41 inward and downward to the engine cylinder when the air valve 28 is unseated. Such air is supplied by a manifold 43 through branches 44, one leading to each cylinder head. Air is supplied to manifold 43 by a compressor or blower of any suitable type driven in any known way. Since this mechanism is conventional it is not illustrated.

Between chambers 35 and 41 sleeve 27 works in a guide 45 and above chamber 35 it works in a guide bushing 46 set in the cylinder head and having an external positioning flange 47. The air valve is urged in a closing direction (upward) by a coil compression spring 48 reaching between the flange 47 and a spring seat 49 attached to the upper end of sleeve 27.

At the upper end of the cored portion of sleeve 27, and below the upper end of the sleeve, is a web 51 in which are formed two ports. The first is an oil entrance port from which a pipe 52 extends through the core of the air valve, and through one web 37, far enough to discharge cooling oil adjacent the head 28 of the air valve. The other is an oil return port 53. Resting on web 51 is an annular thrust disc 54 which has in its lower face two annular grooves. One of these, 55, connects port 53 with spill pipe 56 (see Fig. 1) from which the discharging oil drains over the cylinder head and to the engine sump.

The other groove, 57, receives oil under pressure from connections to be described.

Exhaust valve 23 is urged seated by a coil compression spring 58 which reacts between disc 54 and a spring seat 59 attached to the upper end of stem 33.

The exhaust valve 23 is actuated by a rocker 61 fulcrumed at 62, and rocked by push rod 63. The air valve 28 is actuated by a second rocker 64 which is fulcrumed at 65 and rocked by push rod 66. Rocker 64 has two fingers 67 which react on the valve through short hollow push rods 68 seated at their ends in spherical sockets formed in the fingers 67 and disc 54, respectively.

On cam shaft 7 are cams, one of which appears at 69 in Fig. 1 and is one of the cams for actuating air valve push rods 66. Other timed cams not shown in the drawing, but located on shaft 7, operate the exhaust valve push rods 63.

Each cam engages a roller 71 on a corresponding follower 72. The followers are journaled on a tubular shaft 73. The push rods have spherical ends seated in sockets formed in the corresponding follower and rocker as clearly shown in Fig. 1.

The valves may be variously timed but the following values are typical. The exhaust valve opens at an angle between 100° and 130° past top dead center, depending on the designed speed of the engine, and closes 10° to 25° after bottom dead center. The scavenge (inlet) valve opens 150° to 170° after top dead center and closes 25° to 40° after bottom dead center.

Oil is fed under pressure from the lubricating pump to the bore of shaft 73. Thence it passes through a port 74 in each follower 72 to the bore of the related tubular push rod 66, thence through ports 75 drilled in rocker 64 and fingers 67 to tubular push rods 68 and thence to groove 57 and pipe 52. All bearings in the valve actuating gear for the air valve are lubricated and the excess oil flows through the core of the air valve and discharges through pipe 56. Thus the air valve and the seat of the exhaust valve are adequately cooled.

Oil similarly fed to the actuating gear for the exhaust valves has no cooling function to perform. The cam followers and push rods for the exhaust valves are ported in the manner already described as to similar parts which actuate the air valve. This is done simply to afford lubrication.

As stated, the water connections to the jacket spaces are conventional and only partly illustrated. A water manifold is illustrated at 76 in Fig. 1 and has branch connections 77 to the water spaces 14 in the various cylinder heads.

In the engine here illustrated, the diameter of the air valve is about 0.8 the diameter of the cylinder bore and the exhaust valve diameter about 0.45. These dimensions are not critical because effective area past an open valve can be varied by varying the valve lift. More important are the facts that the air valve discharges substantially at the crest of annular chamber 25 and that the flow area through the air valve materially exceeds that through the exhaust valve. Assuming equal lifts, the ratio would be nearly 2 to 1 in the example illustrated.

The toric form of the combustion chamber is important. By giving this an outside diameter larger than that of the cylinder bore it is possible to use an air valve of larger diameter than would otherwise be practicable. By using the minimum practicable clearance between the exhaust valve 23 and the central portion of piston 22, the condition diagrammed in Fig. 4 is attained. As the piston approaches the head end dead point the air charge undergoing compression in the cylinder is displaced rapidly from the space between the exhaust valve and the piston into the toric chamber 25, and induces what might be described as a vortex ring in the chamber 25. Thus, violent turbulence exists at the start of fuel injection.

Within reasonable limits the characteristics above specified can be had with a considerable range of proportions, a fact which permits the invention to be adapted to engines using different fuels, and operating at different speeds, and with air supplied at different pressures. As already stated, the timing of the air inlet valve and exhaust valve can be selected according to the contemplated speed of the engine and the degree of supercharging desired. In practically any case the parts may be so proportioned and arranged that the benefits of the invention, as to cooling the cylinder walls, absence of unscavenged pockets and freedom from back-surge of exhaust gases, may be had.

The use of a large air valve permits the engine to be run at high speed, while ensuring an adequate air supply. Such a valve will furnish air in much larger quantity than is practicable with a port scavenged two cycle engine. The cylinder walls are swept by cool air. The scavenging air and the exhaust tend to follow distinct paths. Back flow from the exhaust manifold is effectively resisted. Excellent turbulence is assured at the moment of fuel injection. Thus a number of advantageous results flow from the form and location of the valves and from the special and related configurations of the piston and the head end of the cylinder.

What is claimed is:

1. In a two-cycle engine the combination of a cylinder having a head formed with inlet and exhaust passages and having an inlet valve seat for controlling the inlet passage; a piston reciprocable in said cylinder and defining therein a working space; inlet and exhaust valves of the poppet type mounted in said head, the inlet valve coacting with said inlet valve seat and having an exhaust passage and exhaust valve seat arranged to control flow to the exhaust passage in the head, the exhaust valve being materially smaller than the inlet valve and coacting with said exhaust valve seat to control said exhaust passage, said inlet valve and its seat being dimensioned and arranged to supply air to the working space in an annular stream adjacent the walls of the cylinder bore; and means for reciprocating said piston and actuating said valves in such timed relation that both valves are closed when the piston is adjacent the head end dead point and as the piston approaches the crank end dead point first the exhaust valve and then the inlet valve open, and both valves close not later than the initial portion of the return excursion of the piston.

2. The combination of the structure defined in claim 1 and guiding means arranged to impart to air entering the working space past the inlet valve, a whirling motion about the axis of the cylinder.

3. The combination defined in claim 1 in which the valves are operated in the timed relation specified and the exhaust valve closes before the inlet valve closes.

4. The combination defined in claim 1 in which the diameter of the air inlet valve is less than the diameter of the cylinder bore but more than half thereof and the diameter of the exhaust valve is less than half the diameter of the cylinder bore.

5. The combination defined in claim 1 in which the air valve is of hollow construction, and connections are afforded to circulate a cooling fluid therethrough.

6. The combination defined in claim 1 in which the air valve is of hollow construction, and connections are afforded to circulate a cooling fluid therethrough, said connections being arranged, at least in part, in said valve actuating means.

7. The combination of a cylinder having a head; a piston reciprocable in the cylinder and enclosing therein a working space; inlet and exhaust valves of the poppet type mounted in said head, the exhaust valve being materially smaller than the inlet valve and serving to control an exhaust passage which extends from the working space through the inlet valve, said valves in closed condition forming a convex spheroidal projection into the working space, the piston having a central concavity which closely approximates said spheroidal projection at the head end dead point of the piston, and the piston and cylinder having coved marginal portions which, at the head end dead point, mate to define a substantially toric combustion chamber, the upper zone of said chamber being adjacent the margin of the inlet valve; at least one fuel nozzle arranged to project fuel substantially circumferentially of said toric chamber; and means for reciprocating said piston and actuating said valves in such timed relation that both valves are closed when the piston is adjacent the head end dead point and as the piston approaches the crank end dead point first the exhaust valve and then the inlet valve open, and both valves close not later than the initial portion of the return excursion of the piston.

8. The combination of the structure defined in claim 7 and guiding means arranged to impart to air entering the working space past the inlet valve, a whirling motion about the axis of the cylinder.

9. The combination defined in claim 7 in which the valves are operated in the timed relation specified and the exhaust valve closes before the inlet valve closes.

KARL V. ANDERSON.

REFERENCES CITED

The following references are of record in the file of this patent:

UNITED STATES PATENTS

| Number | Name | Date |
|---|---|---|
| 1,133,740 | Nygaard | Mar. 30, 1915 |
| 1,191,150 | Brown | July 18, 1916 |
| 1,329,811 | Smith | Feb. 3, 1920 |
| 2,107,389 | Price et al. | Feb. 8, 1938 |